(12) United States Patent
Marion

(10) Patent No.: US 12,000,133 B2
(45) Date of Patent: Jun. 4, 2024

(54) AIR ODOR REMOVAL SYSTEM WITH SEWAGE PLUMBING ATTACHMENT

(71) Applicant: John Marion, Lake Placid, FL (US)

(72) Inventor: John Marion, Lake Placid, FL (US)

(*) Notice: Subject to any disclaimer, the term of this patent is extended or adjusted under 35 U.S.C. 154(b) by 601 days.

(21) Appl. No.: 17/024,616

(22) Filed: Sep. 17, 2020

(65) Prior Publication Data

US 2022/0081888 A1    Mar. 17, 2022

(51) Int. Cl.
| | | |
|---|---|---|
| *E03D 9/052* | (2006.01) | |
| *A01K 1/00* | (2006.01) | |
| *A01K 1/01* | (2006.01) | |

(52) U.S. Cl.
CPC ............ *E03D 9/052* (2013.01); *A01K 1/0052* (2013.01); *A01K 1/0107* (2013.01)

(58) Field of Classification Search
CPC .......... E03D 9/052; E03D 9/05; E03D 9/054; A01K 1/0107; A47K 11/02
USPC ...................................................... 4/213, 216
See application file for complete search history.

(56) References Cited

U.S. PATENT DOCUMENTS

| | | | | |
|---|---|---|---|---|
| 4,583,250 A | * | 4/1986 | Valarao .................... | E03D 9/052 4/209 R |
| 5,029,346 A | | 7/1991 | Fernald, Sr. | |
| 5,361,422 A | * | 11/1994 | Vincent ..................... | E03D 9/05 4/216 |
| 5,386,594 A | | 2/1995 | Hilton | |
| 5,449,029 A | * | 9/1995 | Harris .............. | B60K 15/03519 141/303 |
| 5,727,263 A | | 3/1998 | Hugo Ceja Estrada | |
| 5,996,533 A | * | 12/1999 | Gordon .................. | A01K 1/011 119/166 |
| 6,694,534 B2 | | 2/2004 | Stone | |
| 7,162,751 B2 | * | 1/2007 | Mundt ...................... | E03D 9/05 55/319 |
| 7,856,675 B1 | * | 12/2010 | Couturier ................ | E03D 9/052 4/216 |
| 9,512,604 B1 | | 12/2016 | Hunter | |
| 10,463,016 B2 | * | 11/2019 | Kfoury .................. | A01K 29/00 |
| 2002/0194670 A1 | * | 12/2002 | Hashemi ................. | E03D 5/092 4/213 |

(Continued)

FOREIGN PATENT DOCUMENTS

| | | |
|---|---|---|
| WO | 2006041836 A1 | 4/2006 |
| WO | 2010065560 A2 | 6/2010 |

*Primary Examiner* — Janie M Loeppke
(74) *Attorney, Agent, or Firm* — Mark C. Johnson; Johnson |Dalal

(57) ABSTRACT

An air odor removal system with sewage or septic plumbing attachment removes odors from a stand-alone structural housing, such as a litter box or toilet bowl. The air odor removal system includes a first odor conduit assembly that is fluidly coupled, from one end, to the structural housing, and from an opposing end to an air mover device that creates a vacuum in the first odor conduit assembly. A motion sensor detects a motion event at the structural housing, and signals the air mover to power on. A second odor conduit assembly carries the odor from the air mover device to a one-way valve. A sewage plumbing conduit carries the odor from the one-way valve, and fluidly couples to a sink and a sewage storage, where the odor is finally discharged. The sewage plumbing conduit comprises a generally U-shaped pipe that restricts the odor from flowing to the sink.

15 Claims, 4 Drawing Sheets

(56) References Cited

U.S. PATENT DOCUMENTS

2009/0089920 A1\* 4/2009 Quick ................... E03D 9/052
  137/511
2013/0263366 A1\* 10/2013 Prete ................... A47K 13/307
  4/209 R
2020/0048887 A1  2/2020 Phillips, Jr.

\* cited by examiner

AIR ODOR REMOVAL SYSTEM WITH SEWAGE PLUMBING ATTACHMENT

FIELD OF THE INVENTION

The present invention relates generally to plumbing systems operably configured to remove odors carried in the air and, more particularly, relates to a plumbing conduit system fluidly coupled to sewage plumbing and a stand-alone structure generating odors therefrom.

BACKGROUND OF THE INVENTION

Typically, excrement and urine waste produce an offensive odor that lingers for a long duration past the time the waste was discharged. For animals, such waste is often discarded in a litter box having a box-shaped configuration, and that is filled with odor-absorbing granules to help absorb the odor from the waste. However, the odor may still remain in proximity to the litter box, despite the use of odor-absorbing granules.

For humans, a toilet bowl is the primary point of waste discharge. The urine and water is deposited in water that resides inside the toilet bowl. Nonetheless, the waste may still emit an unpleasant odor. The toilet bowl is generally designed with a toilet tank that retains and flushes out the water that is used to discharge the waste to a sewage storage.

Unfortunately; litter boxes and toilet bowls have for long been a source of offensive odors. Such designs have heretofore contained no internal means for effectively eliminating odors generated in their proximity. Nor is there a means to detect motion from a user in the litter box or toilet bowl, so as to activate odor removing means. Nor is there a way to leverage existing plumbing conduits to carry away the odor from the litter boxes and toilet bowls.

Often, chemical disinfectants are used to help disperse the odors. Such chemicals are used in the toilet tank or in the toilet bowl itself. The use of chemical disinfectants is often not efficacious for removing the odor, serving only to mask toilet odors rather than eliminating them. Further, the chemicals are often disposed of in a non-ecofriendly manner. Another means for removing odors, from a bathroom, includes an exhaust fan. However, the exhaust fan must move large quantities of air from the litter box or toilet bowl to the out of resulting in an increase in the dispersion of offensive odors throughout the room, since the air is biased away from the toilet bowl, and dispersed in a larger area.

Therefore, a need exists to overcome the problems with the prior art as discussed above.

SUMMARY OF THE INVENTION

The invention provides an air odor removal system with sewage or septic plumbing attachment that overcomes the herein-aforementioned disadvantages of the heretofore-known devices and methods of this general type and that works with plumbing systems to remove odors carried in the air. The air odor removal system includes a plumbing conduit system that is fluidly coupled from one end to a sewage or septic plumbing systems, and from an opposing end to a stand-alone structure that contains odor-generating waste, i.e., excrement, urine. An air mover device induces a vacuum at the stand-alone structure, such that a flow of air carries odor from the stand-alone structure to the sewage or septic systems through an attached arrangement of conduits and one-way valves.

With the foregoing and other objects in view, there is provided, in accordance with the invention, an air odor removal system with sewage plumbing attachment. The air odor removal system comprises a structural housing having a partial enclosure. The partial enclosure defines a structural cavity, often where waste is collected.

The air odor removal system further comprises a first odor conduit assembly defined by a first end and an opposing second end. The first end couples to the partial enclosure of the structural housing. The second end couples to an intake port of an air mover device. The air mover device is operably configured to induce a flow of air, and is electrically coupled to a power source.

The air odor removal system further comprises a second odor conduit assembly with a first end and a second end. The first end is coupled to an exhaust port of the air mover device. The second end of the second odor conduit assembly couples to a one-way valve that restricts air flow (and odor) from backflowing to the first odor conduit assembly.

The air odor removal system further comprises a sewage plumbing conduit that is fluidly coupled to both, a sink and a sewage storage. The sewage plumbing conduit carries the air flow with odor to discharge in the sewage storage. The sewage plumbing conduit also has a U-shape that restricts air flow from flowing into the sink. Further, the sewage plumbing conduit is mechanically and fluidly coupled to the one-way valve. And the one-way valve is operably configured to selectively fluidly couple the sewage plumbing conduit with the second odor conduit assembly when a negative pressure is within the sewage plumbing conduit proximal to the one-way valve.

In accordance with another feature, the structural housing further comprises either a litter box or a toilet bowl; both of which are known in the art to retain waste that generates an odor.

In accordance with another feature, the air mover device is operably configured to induce a negative pressure within the first odor conduit assembly, such that the a vacuum carries the odor from the structural housing.

In accordance with a further feature of the present invention, an embodiment of the present invention further includes a motion sensor operably coupled to the structural housing that is operably configured to detect motion within the structural cavity. The motion sensor is communicatively coupled to the air mover device. In this manner, the motion sensor is operably configured, upon detection of a motion event within the structural cavity, to signal the air mover device. This actuates the air mover device to induce the negative pressure within the first odor conduit assembly.

In accordance with a further feature of the present invention, the motion sensor signals to the air mover device through a communication mechanism, which may include, without limitation, a wire, a wireless transmission, electronically, and digitally.

In accordance with a further feature of the present invention, the structural housing comprises a toilet bowl. The toilet bowl comprises a toilet tank having a flush valve tube fluidly coupled to the first odor conduit assembly. The first odor conduit assembly is also operably joined with a float valve configured to selectively open and close the first odor conduit assembly with respect to the toilet tank water level to regulate vacuum, i.e., air vacuum break valve.

In accordance with a further feature of the present invention, the partial enclosure of the structural housing comprises a seal that is configured to enhance the negative pressure induced within the first odor conduit assembly by the air mover device.

In accordance with a further feature of the present invention, the sewage storage comprises a septic tank, or a sewage system, or both.

In accordance with a further feature of the present invention, the power source is operable to be electrically coupled to a 120 VAC source or battery powered.

In accordance with a further feature of the present invention, the one-way valve comprises an air admittance valve.

In accordance with a further feature of the present invention, the sewage plumbing conduit and the one-way valve are mechanically and fluidly coupled with a threaded or a push-fit joint and a seal.

In accordance with a further feature of the present invention, the sewage plumbing conduit comprises a generally U-shaped pipe, which can include at least one of the following: a J-trap, a P-trap, an S-trap, an S-bend, and a generally U-shaped pipe.

Although the invention is illustrated and described herein as embodied in an air odor removal system with sewage plumbing attachment, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the odor conduit assemblies.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
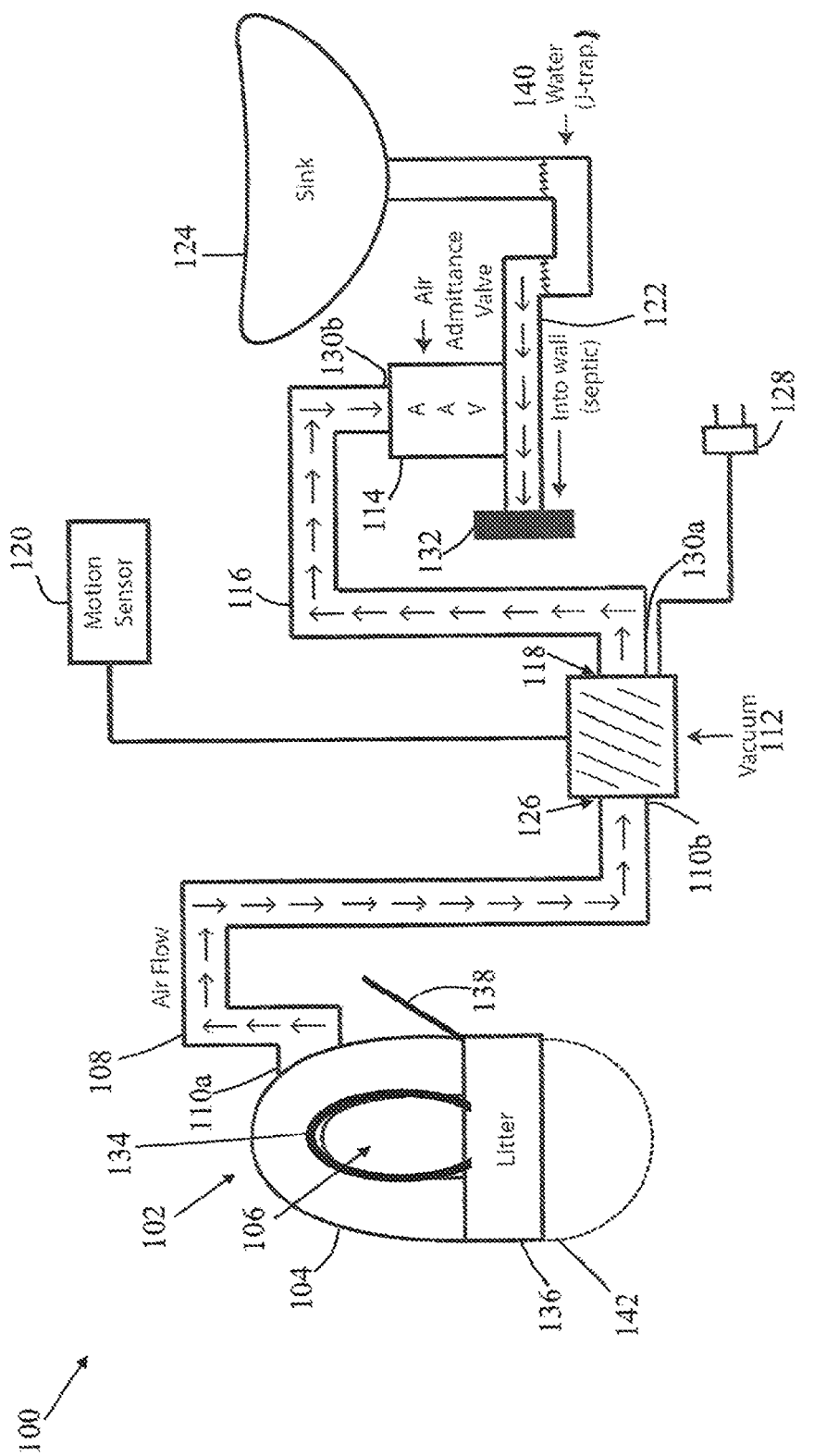
FIG. 1 is a block diagram of an exemplary air odor removal system with sewage or septic plumbing attachment, showing a structural housing with odor as a litter box, in accordance with an exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient air odor removal system with sewage or septic plumbing attachment. Embodiments of the invention provide a plumbing conduit system that is fluidly coupled from one end to a sewage or septic plumbing systems, and from an opposing end to a stand-alone structure that is generating odors. In addition, embodiments of the invention provide An air mover device induces a vacuum at the stand-alone structure, such that a flow of air carries odor from the stand-alone structure to the sewage or septic plumbing systems.

Referring now to FIG. 1, one embodiment of the present invention is shown in a block diagram view of the system. FIG. 1 shows several advantageous features of the present invention, but, as will be described below, the invention can be provided in several shapes, sizes, combinations of features and components, and varying numbers and functions of the components. The first example of an air odor removal system 100 with sewage or septic plumbing attachment, hereafter "system 100", includes a structural housing 102, 202. The structural housing is a structure that is known in the art to retain waste, such as excrement, utine, and garbage. This causes the structural housing to emit an unpleasant odor in the proximity thereof. And further, because the structural housing 102, 202 may be enclosed in a closed room, such as a bathroom or domestic room, the odor remains suspended in the air.

Thus, efficiently removing the odor to a distally located sewage storage 132 is a primary objective of the present invention. The structural housing 102, 202 is configured with a partial enclosure 104, 204 that forms a structural cavity 106, 205. The partial enclosure 104, 204 helps retain the odor generated by the excrement and urine waste inside the confines of the structural cavity 106, 205. The structural cavity 106, 205 is substantially where the waste and odor-absorbing granules, or waste and water, reside.

In one embodiment, the structural housing 102, 202 includes a seal 134 (toilet lid seal not pictured) around the periphery of the partial enclosure 104, 204. The seal creates a tighter enclosure for the structural cavity, which serves to enhance a vacuum therein. The vacuum induces a flow of air that carries the odor away from the structural cavity 106, 205 of the structural housing 102, 202. As described below, the seal can be coupled to the periphery of a toilet lid, or a lid for a litter box. In one non-limiting embodiment, the seal 134 (toilet lid seal not pictured) comprises a rubber gasket that is shaped to fit the periphery of the partial enclosure 104, 204 for the structural housing 102, 202. Also there may be a gasket FIG. 2 #214 between the toilet tank 216 and the toilet tank lid (not pictured) to provide a space for the first odor conduit to pass through.

In one possible embodiment, referenced in FIG. 1, the structural housing 102 is a litter box 142, such as used by a pet or a toddler training toilet to deposit excrement and urine waste. The litter box 142 may contain odor-absorbing granules and charcoal that help absorb the odor from the waste. However, the odor may still remain, despite the use of odor-absorbing granules.

In some embodiments, the litter box 142 may comprise of a box 136 and an operatively connected lid 138. The box 136 is sized and dimensioned to retain the odor-absorbing granules, receive waste from the pet or toddler. The lid 138 can be hingedly, slidably, or detachably coupled to the box 136, covering the structural cavity therein. A first odor conduit assembly 108, described below, is in fluid communication with the structural cavity formed in the box 136, so as to carry away the odor therefrom. The lid 138 can include a seal 134 around the periphery that enhances the negative pressure induced within the first odor conduit assembly 108.

Figure 2:
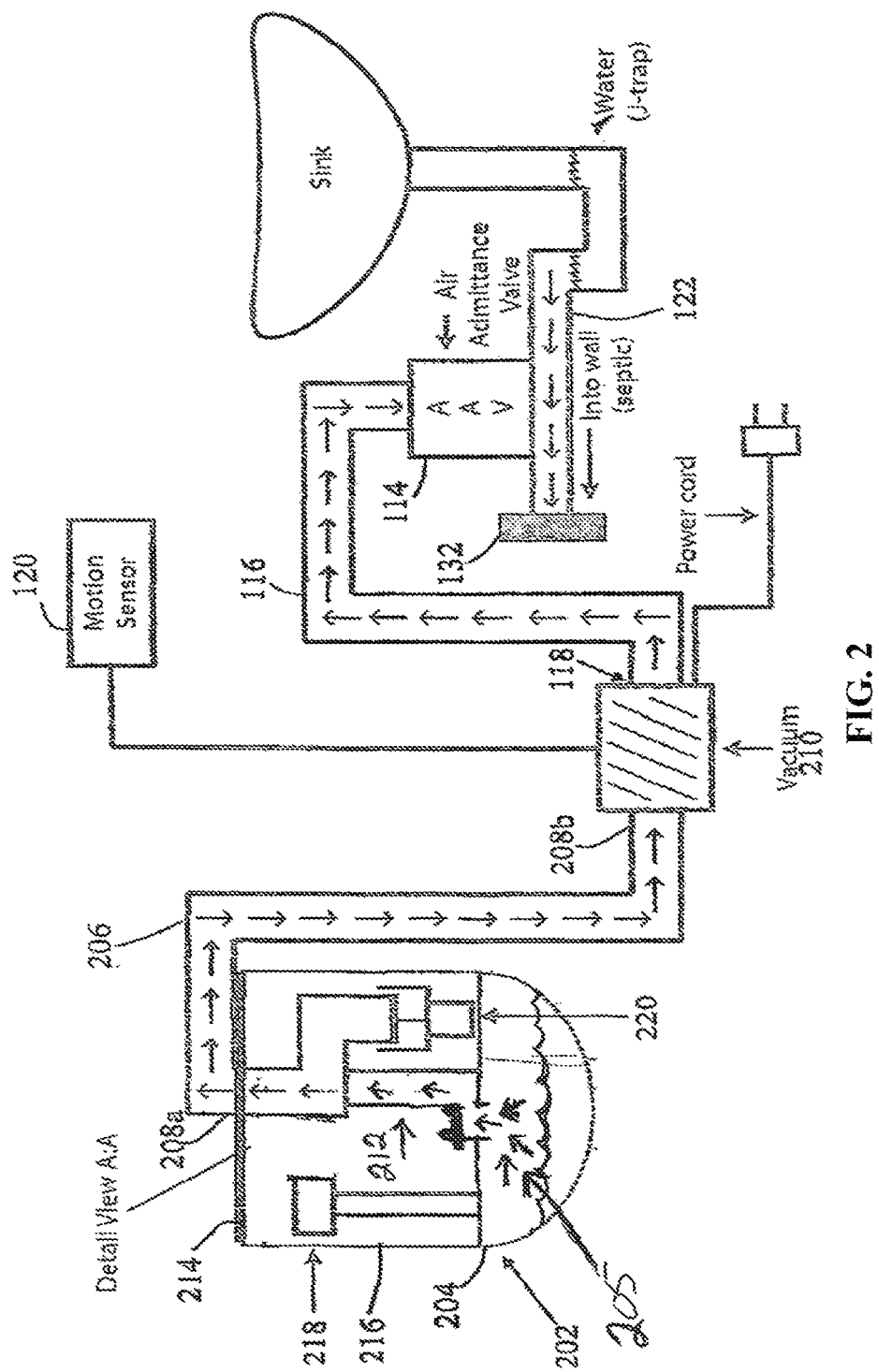
FIG. 2 is a block diagram of an exemplary air odor removal system with sewage or septic plumbing attachment, showing a structural housing with odor as a toilet bowl, in accordance with an exemplary embodiment of the present invention.

In another possible embodiment, shown in FIG. 2, the structural housing 202 is a toilet bowl 204. The toilet bowl 204 may include a plumbing sanitation fixture used for the disposal of human excrement and urine. The excrement and urine are deposited in toilet structure cavity 205 that resides inside the toilet bowl 204. Nonetheless, the waste may still emit an unpleasant odor.

Figure 4:
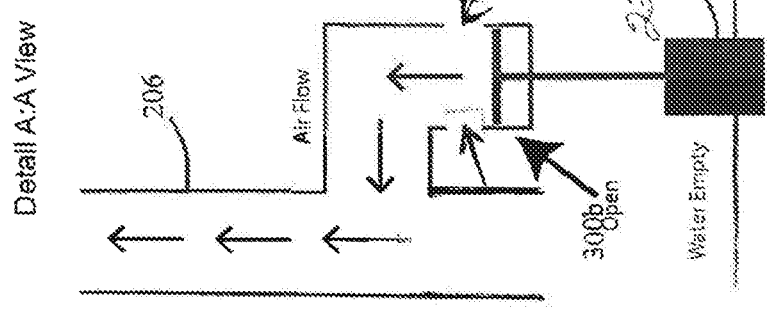
FIG. 4 is a close-up view of the first end of a first odor conduit assembly in fluid communication with a float valve in the open position, in accordance with an exemplary embodiment of the present invention.

FIG. 4 is a close-up view of a first end of the first odor conduit assembly 206 in fluid communication with a float valve 220 in the open position 300*b*. A second end 208*b* couples to an air mover device 210, described below, to induce air flow through the first odor conduit assembly 206. This mechanism, 220 is for controlling the vacuum in the first odor conduit assembly.

To flush away the waste, the toilet bowl 204 comprises a toilet tank 216 that retains and flushes out the water that is used to discharge the waste to a sewage storage 132. In some embodiments, the toilet tank 216 has a flush valve tube 212 that is fluidly coupled to the first odor conduit assembly 206. The toilet tank 216 includes a water fill valve 218 that is configured to regulate the filling of water inside the toilet tank 216.

When the toilet is flushed, the water in the toilet tank 216 drops. The float valve 220 (See FIG. 4) 300*b*, moves to the open position. The vacuum is broken to allow the water to clear from the flush valve tube 212, before the vacuum resumes.

Figure 3:
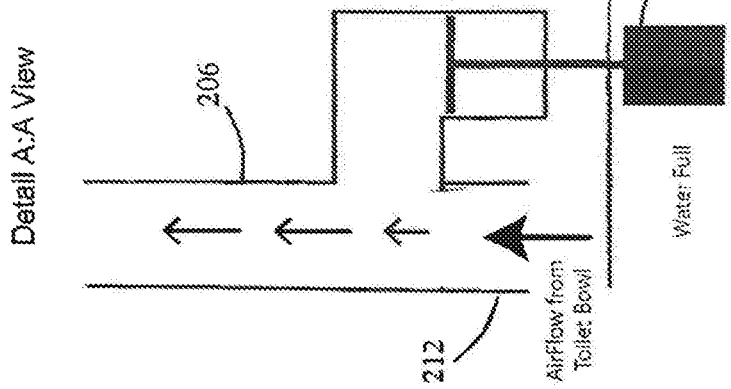
FIG. 3 is a close-up view of the first end of a first odor conduit assembly in fluid communication with a float valve in the closed position, in accordance with an exemplary embodiment of the present invention.

After the toilet tank is flushed, the water fill valve 218 opens, which refills the toilet tank 216. When the toilet tank is refilled, the float valve 220 closes (see FIG. 3) 300*a*, and vacuum is able to continue through the flush valve tube.

Looking again at FIG. 1, the system 100 also utilizes a first odor conduit assembly 108, which serves as an initial conduit to carry the odor away from the structural housing 102. The first odor conduit assembly 108 may include a pipe or tube, known in the art of plumbing. In some embodiments, the first odor conduit assembly 108 may include, without limitation, a ½", 1", and 2" PVC pipe; or a copper pipe.

In some embodiments, the first odor conduit assembly 108 is defined by a first end 110*a* that orients towards the structural housing 102, and a second end 110*b* that orients towards the air mover device 112. The first end 110*a* couples to the partial enclosure 104 of the structural housing 102, 202. In one possible embodiment, the first end 110*a* of the first odor conduit assembly 108, and the structural housing 102 are mechanically and fluidly coupled with a push-fit joint and a seal 134. This is possible because the partial enclosure 104 of the structural housing 102, 202 comprises a seal 134. Such as seal is configured to enhance the negative pressure induced within the first odor conduit assembly 108 by the air mover device 112.

The second end 110*b* of the first odor conduit assembly 108 couples to an intake port 126 of an air mover device 112. In some embodiments, the air mover device 112 is operably configured to induce a negative pressure within the first odor conduit assembly 108, such that the vacuum carries the odor away from the structural housing 102. In one embodiment, the second end 110*b* and the intake port 126 are mechanically and fluidly coupled with a push-fit joint and a seal.

It is significant to note that the first odor conduit assembly 108 used for the litter box 142, is substantially the same first odor conduit assembly 206 used with the toilet bowl 204. And the air mover device 112 used for the litter box 142, is substantially the same air mover device 210 used with the toilet bowl 204.

The air mover device 112, 210 is electrically coupled to a power source 128, which can power a motor, a vacuum pump, an air hose, and other components associated with generating a vacuum. In some embodiments, the power source 128 is operable to be electrically coupled to a 120 VAC source or battery powered (See FIG. 5).

On the opposite end of the air mover device 112, 210, a second odor conduit assembly 116 carries the air flow, and odor therein, closer to the final destination of the sewage storage 132. The second odor conduit assembly 116 has substantially the same material content and shape as the first odor conduit assembly 108. The second odor conduit assembly 116 has a first end 130a and an opposing second end 130b. The first end 130a is coupled to an exhaust port 118 of the air mover device 112, 210. In one embodiment, the first end 130a and the exhaust port 118 are mechanically and fluidly coupled with a push-fit joint and a seal. The second end 130b of the second odor conduit assembly 116 couples to a one-way valve 114.

In some embodiments, the one-way valve 114 is an air admittance valve, that uses a system that is activated by negative pressure. As negative pressure occurs, the valve opens to allow air to pass through the one-way valve. Once the pressure balance is recreated, the valve closes again. This allows air to be drawn through when required, but prevents unwanted odors from entering the system. It is known in the art that air admittance valves often feature rubber seals, to help create a complete seal, increasing the effectiveness of the valve and preventing any odors from escaping through small gaps.

Typically, air admittance valves are fitted using a threaded or push-fit joint. This allows pipes and sockets to be fitted together without the use of tools. Push-fit joints may incorporate a rubber seal to create a complete watertight and airtight fitting. However, they can also be used with solvent weld joints. These use a chemical reaction during the application of a solvent to create a watertight and airtight permanent bond.

In one possible embodiment, the one-way valve 114 restricts the air flow and odor therein from returning to the structural housing 102, 202 through the first odor conduit assembly 108. In one non-limiting embodiment, the one-way valve 114 is an air admittance valve. Though in other embodiments, different types of one-way valves may also be used.

The air odor removal system 100 further comprises a sewage plumbing conduit 122 that serves as the final conduit pathway for the odor before discharge into the sewage storage 132. The sewage plumbing conduit 122 is fluidly coupled to a sink 124 and a sewage storage 132. In some embodiments, the sewage plumbing conduit 122 comprises a generally U-shaped pipe 140. The generally U-shaped pipe helps restricts the air flow carrying the odor from flowing to the sink. The U-shaped pipe may include, without limitation, a J-trap, a P-trap, an S-trap, and an S-bend.

As discussed above, the sewage plumbing conduit 122 mechanically and fluidly couples to the one-way valve 114, receiving the flow of air containing the odor from the second odor conduit assembly 116. The sewage plumbing conduit 122 and the one-way valve 114 may be both, mechanically and fluidly coupled with a threaded or push-fit joint and a seal. This sealing effect serves to enhance the vacuum in the conduit assemblies, which creates a stronger air flow for carrying away the odor.

The one-way valve 114 is operably configured to selectively fluidly couple the sewage plumbing conduit 122 with the second odor conduit assembly 116 when a negative pressure is within the sewage plumbing conduit 122. Thus, the one-way valve 114 only opens when a vacuum is present. This coupling arrangement allows the odor from the structural housing 102, 202 to flow through the first odor conduit assembly 108, 206; the air mover device 112, 210; and the second odor conduit assembly 116, than through the one-way valve and to finally discharge through the sewage storage 132.

In some embodiments, the system 100 may also provide a motion sensor 120 that is used to initiate operation of the air mover device 112, 210, upon detection of a motion event at the structural housing. In this motion-event signaling arrangement, the structural housing is operably configured to detect a motion event within the structural cavity 106. For example, the motion event can be a person be approaching or sitting on a toilet bowl 204, or leaving a toilet bowl 204. Another motion event can be a cat entering or leaving a litter box 142. In alternative embodiments, a heat sensor can be used to detect heat from excrement waste, which creates an event. In yet other embodiments, additional events may be detected and converted into action by the air mover device.

As referenced in FIGS. 1 and 2, the motion sensor 120 is operably coupled to the structural housing 102, 202. Additionally, the motion sensor 120 is communicatively coupled to the air mover device 112, 210. In this manner, the motion sensor 120 detects a motion event in proximity to the structural housing 102, 202, or inside the structural cavity 106; and then transmits a signal to the air mover device 112, 210. The signal actuates the air mover device 112, 210, which induces the negative pressure within the first odor conduit assembly 108, 206. The signal may also regulate speeds for the fan that generates the vacuum.

As discussed above, the negative pressure creates an air flow through the first odor conduit assembly 108, 206. The first odor conduit assembly continues to carry the odor through the second odor conduit assembly, through the one-way valve, and through the sewage plumbing conduit 122, before final discharge through the sewage storage 132. In some embodiments, the sewage storage 132 comprises a septic tank, or a sewage system. It is significant to note that there is substantially no difference in operation of the system 100 when discharging to the septic tank or the sewage system.

The signal from the motion sensor can be a command to power on. In one possible embodiment, the signaling from the motion sensor to the air mover device may be a simple on/off message, which can be configured through a communication mechanism. The signal can also be a speed regulator for the fan that generates the vacuum, i.e., low/medium/high. The communication mechanism may utilize different types of signaling means, including, without limitation, a wire induced signaling, a wireless transmission, electronically signaling, and digitally signaling. The signal can include: a radio signal, an analog signal, a binary signal, a microwave signal, a cable signal, and an acoustic signal.

Figure 5:
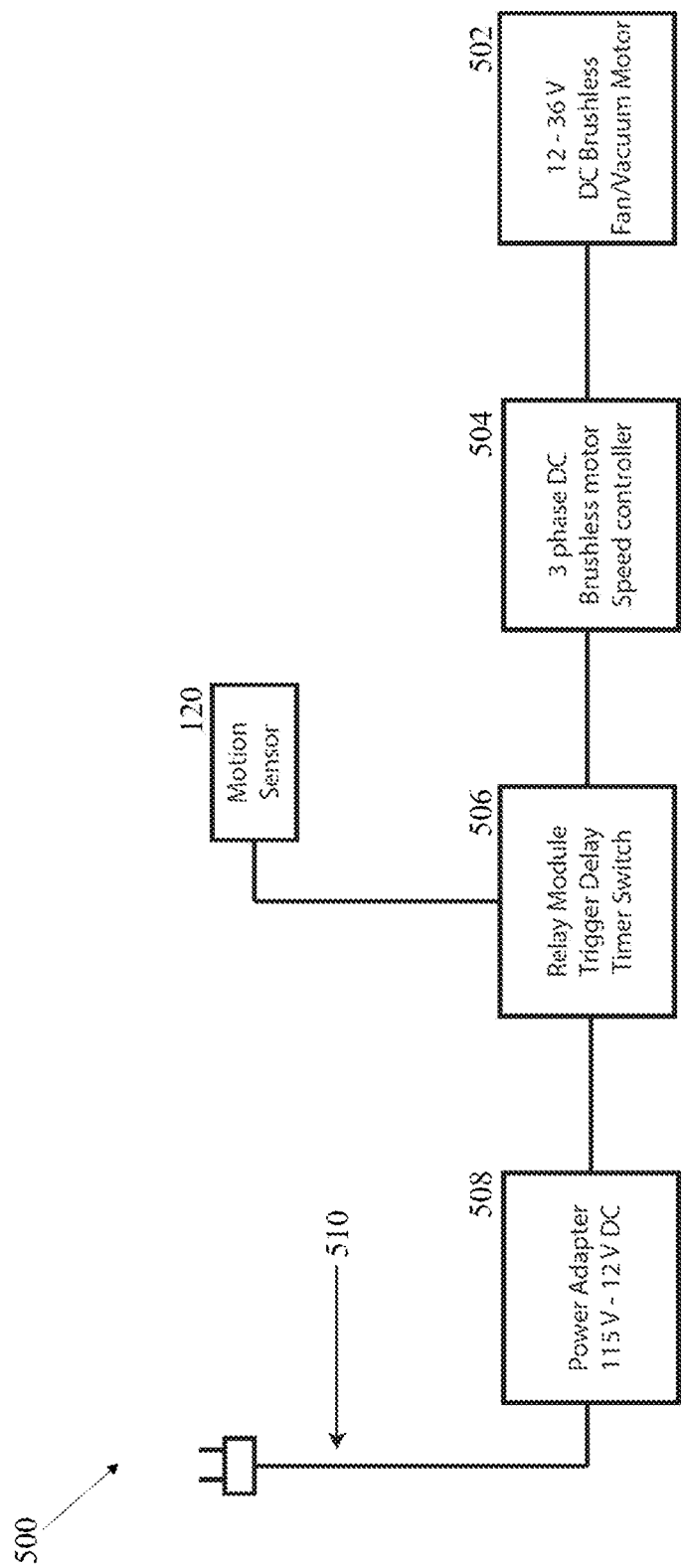
FIG. 5 is a schematic diagram of an exemplary electrical relay timer subsystem, in accordance with an exemplary embodiment of the present invention.

Looking now at FIG. 5, an electrical relay timer subsystem 500 shows one possible embodiment of operational connectivity between the motion sensor 120 and electrical components. The electrical relay subsystem 500 references a relay module trigger delay timer switch 506 that receives the signal from the motion sensor 120. The relay module trigger delay timer switch 506 is configured to start or stop currents from moving in coils and armatures, the moving parts of electrical mechanisms. The relay module trigger delay timer switch 506 may also be configured to allow electrical circuits to release at certain times. The relay module trigger delay timer switch 506 is triggered either by the opening and closing of a signal from the motion sensor.

The electrical relay timer subsystem 500 also provides 12-36 Volt DC brushless fan/vacuum motor 502, which is integral in the air mover device for generating a vacuum. The fan/vacuum motor 502 serves as the air mover device.

Electrically coupled to the fan/vacuum motor 502 is a 3 phase DC brushless motor speed controller 504. The speed controller 504 is configured to regulate the speed of the fan that generates the vacuum through the first odor conduit assembly 108, 206. The speed may be determined by factors, such as: the diameter of the conduit assemblies, the distance between the air mover device and the structural housing, and the amount of odor requiring removal. For powering the motion sensor 120, a power plug 510 connects an external power source 128 to a 115V-12V DC power adapter 508.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. An air odor removal system with sewage plumbing attachment comprising:
    a structural housing having a partial enclosure defining a structural cavity and a toilet tank having a flush valve tube fluidly coupled to the structural cavity and a float valve disposed within the toilet tank, the flush valve tube having an extended portion extending from the flush valve tube, with an end disposed within toilet tank, with an internal surface, and defining an aperture defined on the extended portion and the float valve having a horizontal member spanning in a direction toward the internal surface of the flush valve tube and configured to translate over the aperture defined on the extended portion of the flush valve tube and the float valve having a float member coupled to the horizontal member, protruding passed the end of the extended portion, configured to float in water disposed in the toilet tank;
    a first odor conduit assembly with a first end coupled to the flush valve tube and a second end coupled to an intake port of an air mover device operably configured to induce a flow of air and electrically coupled to a power source, the flush valve tube fluidly coupled to the first odor conduit assembly and the horizontal member of the float valve operably configured to fluidly couple and uncouple the first odor conduit assembly to the toilet tank through the aperture based on movement of the float member and a water level of the toilet tank;
    a second odor conduit assembly with a first end coupled to an exhaust port of the air mover device and a second end coupled to a one-way valve; and
    a sewage plumbing conduit fluidly coupled to a sink and a sewage storage, the sewage plumbing conduit having the one-way valve mechanically and fluidly coupled thereto and the one-way valve operably configured to selectively fluidly couple the sewage plumbing conduit with the second odor conduit assembly when a negative pressure is within the sewage plumbing conduit proximal to the one-way valve.

2. The system according to claim 1, wherein the structural housing further comprises:
    either a litter box, child training toilet or a toilet bowl.

3. The system according to claim 1, wherein the air mover device is operably configured to induce a negative pressure within the first odor conduit assembly.

4. The system according to claim 3, wherein the partial enclosure of the structural housing comprises a seal, the seal operable to enhance the negative pressure induced within the first odor conduit assembly by the air mover device.

5. The system according to claim 4, wherein the sewage plumbing conduit and the one-way valve are mechanically and fluidly coupled with a threaded or push-fit joint and the seal.

6. The system according to claim 3, further comprising:
    a motion sensor operably coupled to the structural housing operably configured to detect motion at or within the structural cavity, and communicatively coupled to the air mover device, wherein the motion sensor is operably configured, upon detection of a motion event at or within the structural cavity, to signal the air mover device to induce the negative pressure within the first odor conduit assembly.

7. The system according to claim 6, wherein the motion sensor signals to the air mover device through at least one of the following: a wire, a wireless transmission, electronically, or digitally.

8. The system according to claim 1, wherein the sewage storage comprises:
    a septic system, or a sewage system, or both.

9. The system according to claim 1, wherein the power source is operable to be electrically coupled to a 120 VAC source or battery power.

10. The system according to claim 1, wherein the one-way valve comprises an air admittance valve.

11. The system according to claim 1, wherein the sewage plumbing conduit includes at least one of the following: a J-trap, a P-trap, an S-trap, an S-bend, and a generally U-shaped pipe.

12. An air odor removal system with sewage plumbing attachment comprising:
    a toilet bowl comprising a partial enclosure defining a structural cavity, the toilet bowl further comprising a toilet tank having a flush valve tube fluidly coupled to the structural cavity and a float valve disposed within the toilet tank, the flush valve tube defining having an extended portion extending from the flush valve tube, with an end disposed within toilet tank, with an internal surface, and an aperture on the extended portion and the float valve having a horizontal member spanning in a direction toward the internal surface of the flush valve tube and configured to translate over the aperture defined on the extended portion of the flush valve tube and the float valve having a float member coupled to the horizontal member, protruding passed the end of the extended portion, configured to float in water disposed in the toilet tank;
    a first odor conduit assembly with a first end coupled to the flush valve tube of the toilet tank and a second end coupled to an intake port of an air mover device operably configured to induce a negative pressure within the first odor conduit assembly and electrically coupled to a power source, the flush valve tube fluidly coupled to the first odor conduit assembly and the horizontal member of the float valve operably configured to fluidly couple and uncouple the first odor conduit assembly to the toilet tank through the aperture based on movement of the float valve and a water level of the toilet tank;
    a second odor conduit assembly with a first end coupled to an exhaust port of the air mover device and a second end coupled to a one-way valve;
    a sewage plumbing conduit fluidly coupled to a sink and a sewage storage, the sewage plumbing conduit having the one-way valve mechanically and fluidly coupled thereto and the one-way valve operably configured to selectively fluidly couple the sewage plumbing conduit with the second odor conduit assembly when a negative pressure is within the sewage plumbing conduit proximal to the one-way valve; and
    a motion sensor operably coupled to the toilet bowl operably configured to detect motion at or within the structural cavity, and communicatively coupled to the air mover device, wherein the motion sensor is operably configured, upon detection of a motion event at or within the structural cavity, to signal the air mover device to induce the negative pressure within the first odor conduit assembly.

13. The system according to claim 12, wherein the partial enclosure of the toilet bowl comprises a seal, the seal operable to enhance the negative pressure induced within the first odor conduit assembly by the air mover device.

14. The system according to claim 13, wherein the sewage plumbing conduit and the one-way valve are mechanically and fluidly coupled with a threaded or push-fit joint and the seal.

15. The system according to claim 12, wherein the sewage storage comprises at least one of a septic system and a sewage system.

* * * * *